D. C. McCANDLESS.
FLASH LIGHT APPARATUS.
APPLICATION FILED SEPT. 21, 1916.
1,225,261. Patented May 8, 1917.
6 SHEETS—SHEET 3.
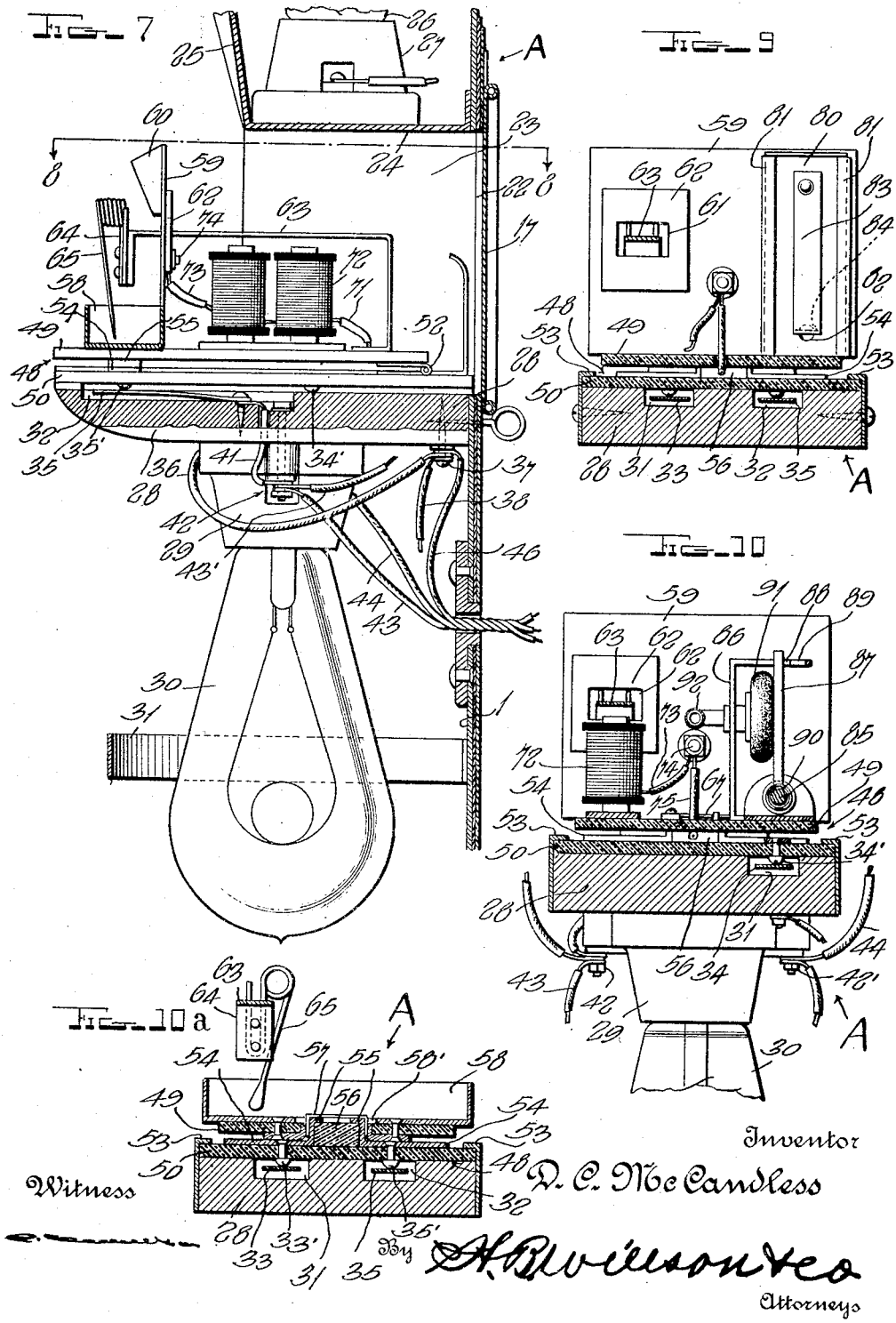
Inventor
D. C. McCandless
Witness
By H. B. Willson & Co.
Attorneys

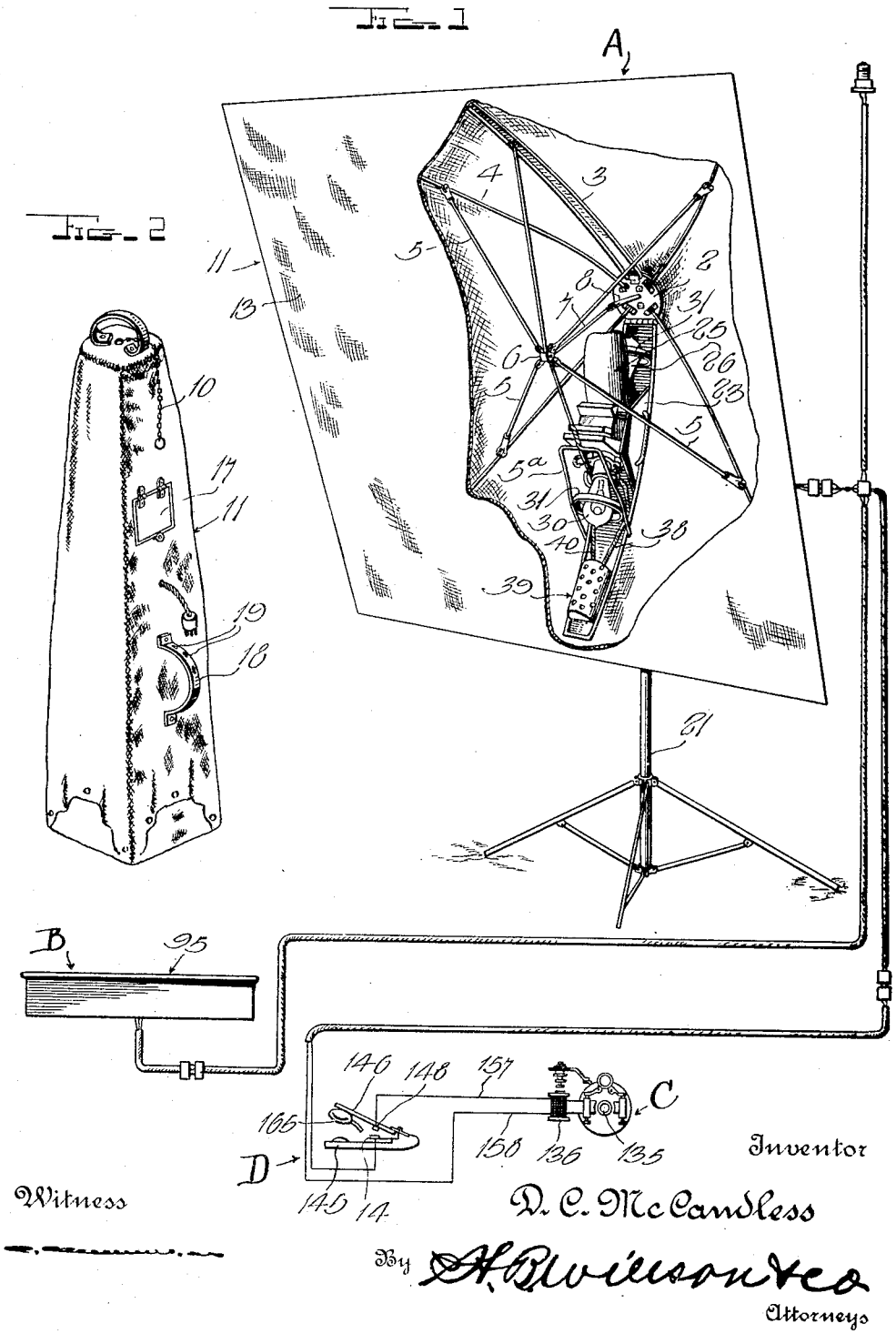

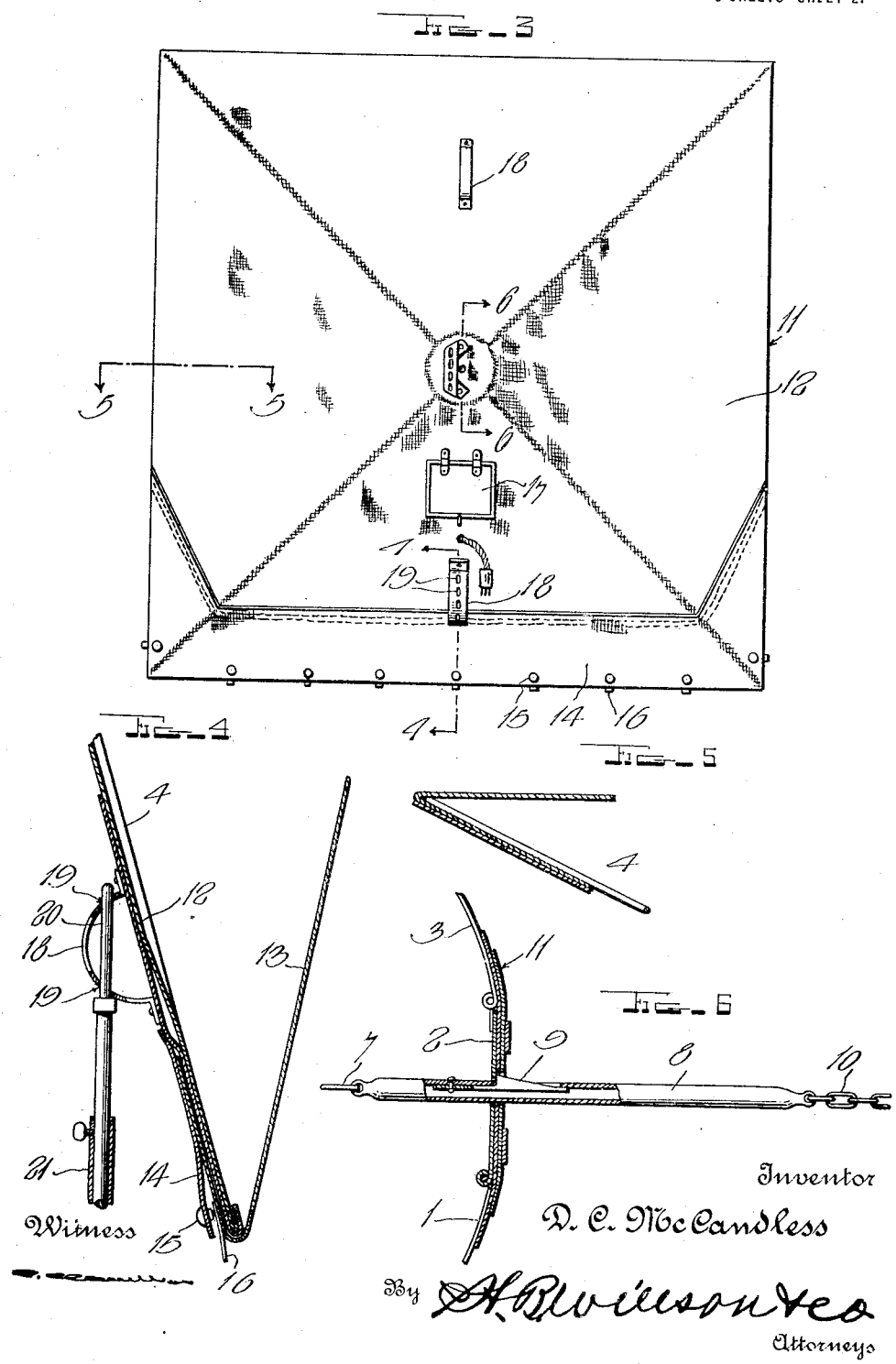

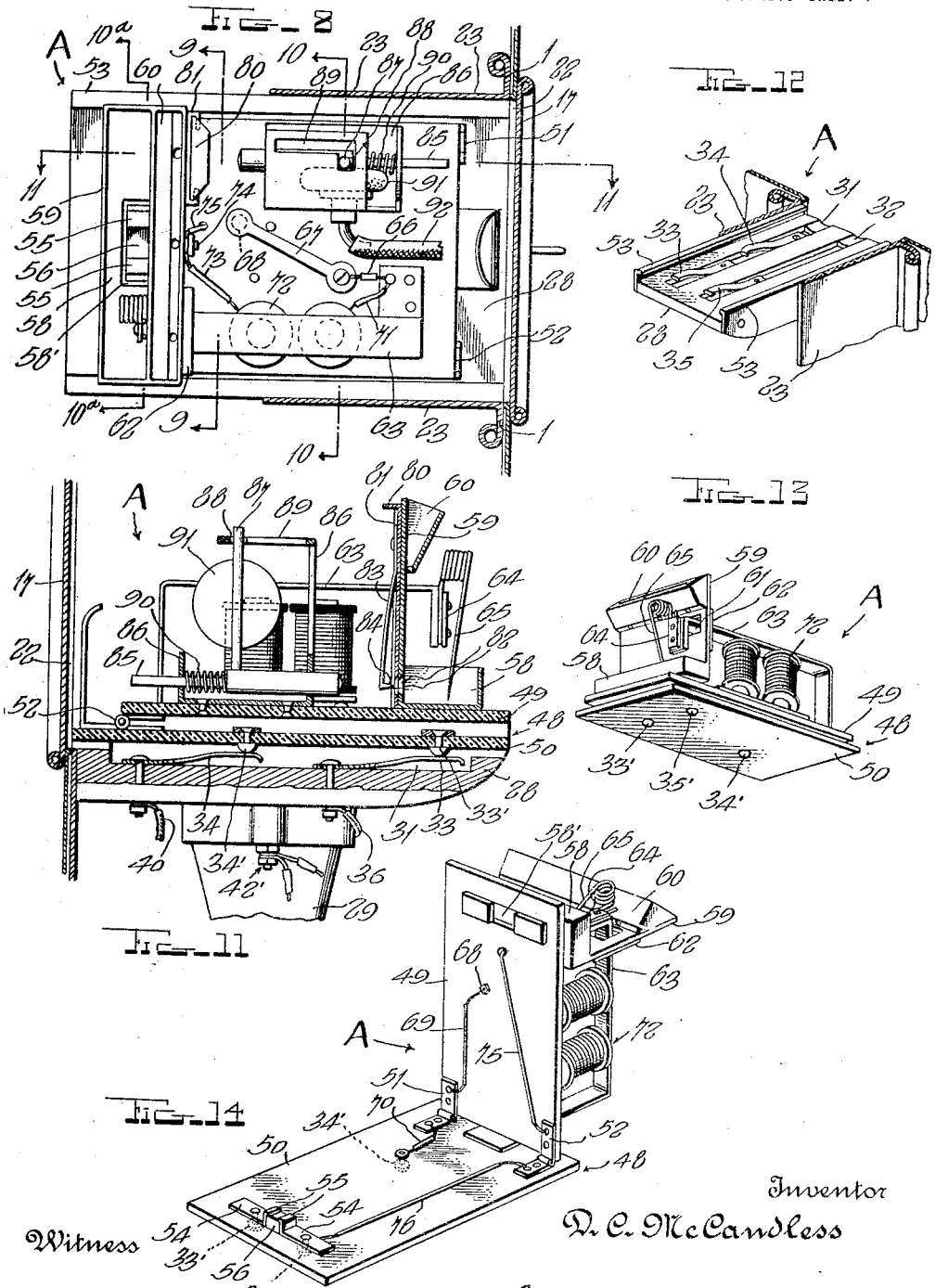

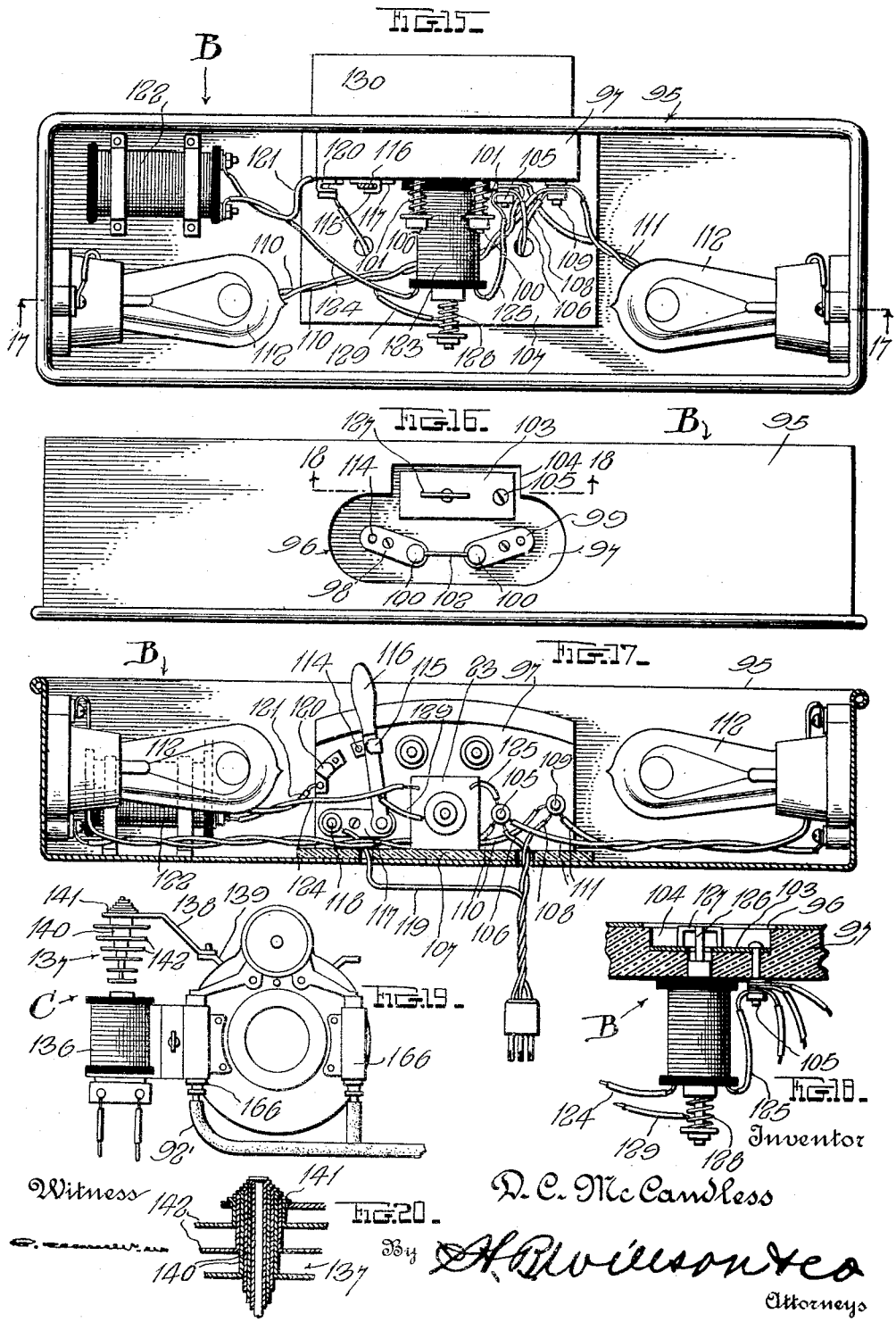

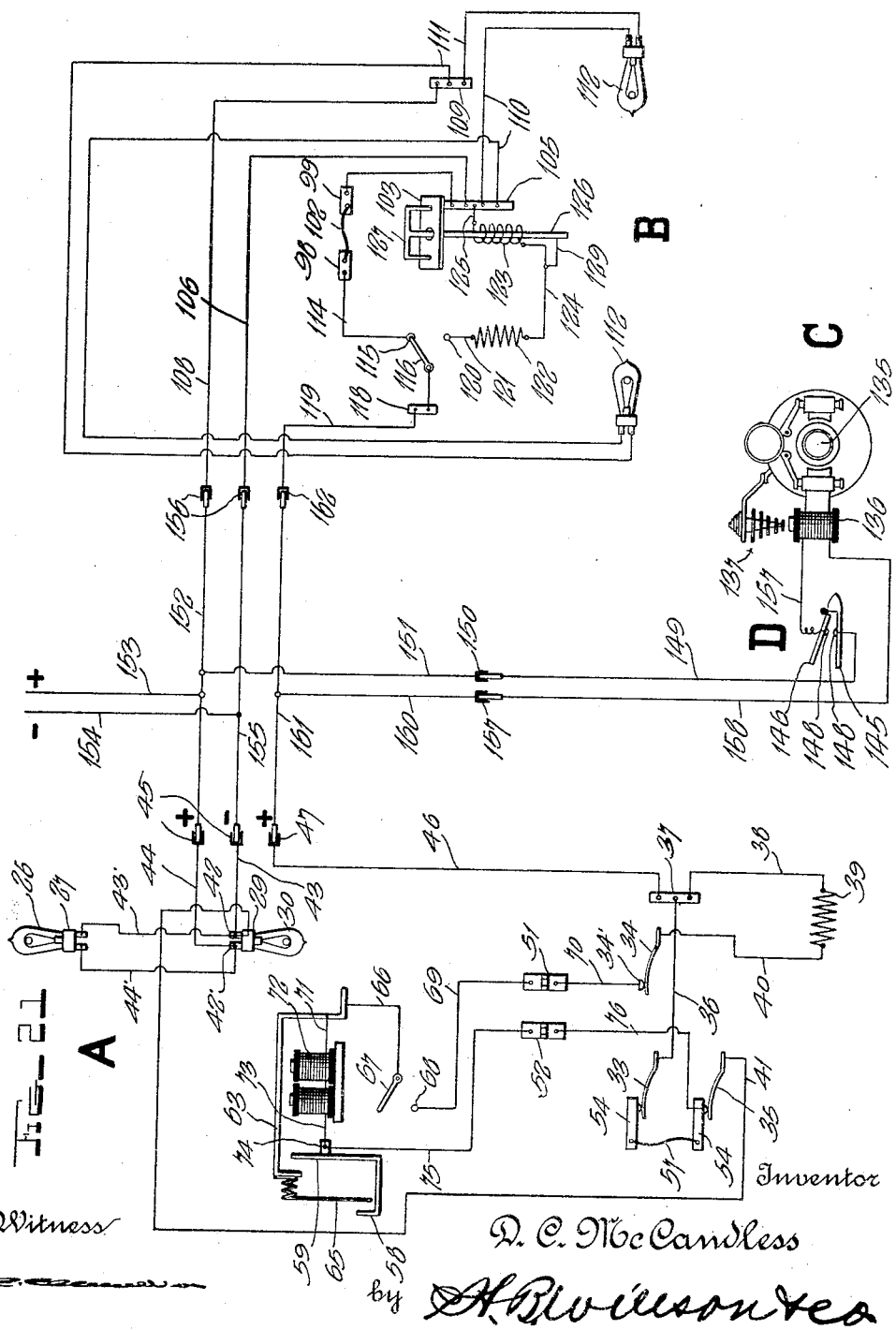

//UNITED STATES PATENT OFFICE.

DAVID CHARLES McCANDLESS, OF BOISE, IDAHO.

FLASH-LIGHT APPARATUS.

1,225,261.

Specification of Letters Patent.

Patented May 8, 1917.

Application filed September 21, 1916. Serial No. 121,473.

*To all whom it may concern:*

Be it known that I, DAVID C. MCCANDLESS, a citizen of the United States, residing at Boise, in the county of Ada and State of Idaho, have invented certain new and useful Improvements in Flash-Light Apparatus; and I do declare the following to be a full, clear, and exact description of the invention, such as will enable others skilled in the art to which it appertains to make and use the same.

My invention relates to improvements in apparatuses for taking photographs by artificial light, and one object of the same is to provide an apparatus by means of which fire light may be well represented with sufficient intensity to permit the photographing of persons who may well be seated by a fireplace, from which part of the rays of light generated by the apparatus will be projected.

Another object is to provide in addition to the device in the fire-place, an additional and screened device for softening the shadows cast by the object or objects.

A further object is to provide a number of constantly illuminated electric lamps disposed one adjacent each flash creating device, whereby the light effects which will be produced upon the object or objects by the flashes may be approximately determined.

Yet another object is to provide the casing in which one of the flashes occurs, with a door through which the flash creating means may be inserted, and to provide coacting contacts for engagement with each other when said means is inserted, thus permitting the electric operating means thereof to be thrown into operation at will.

A still further object is to provide the different flash creating units with fuses which may be blown to ignite powder in the powder pans thereof, to also equip said units with jump spark devices which may also be used to ignite the powder, and to provide means whereby either igniting means of the units may be thrown into operation at will.

Another object is to provide an improved folding casing for containing one of the flash creating devices.

With the foregoing general objects in view, the invention resides in certain novel features of construction, and unique combinations of parts to be hereinafter fully described and claimed, the descriptive matter being supplemented by the accompanying drawings which constitute a part of this application and in which:

Figure 1 is a perspective view of the main flash creating apparatus showing the fire light producer, the operating means for the camera shutter, and the foot control of the entire apparatus in diagram;

Fig. 2 is a perspective view of the aforesaid apparatus in folded position;

Fig. 3 is a rear elevation thereof;

Fig. 4 is a detail vertical section on the plane of the line 4—4 of Fig. 3;

Fig. 5 is a detail horizontal section on the line 5—5 thereof;

Fig. 6 is an additional detail vertical section on the plane of the line 6—6 of Fig. 3;

Fig. 7 is an enlarged sectional view of the flash creating means within the casing shown in Figs. 1 and 3;

Fig. 8 is a horizontal section on the plane of the line 8—8 of Fig. 7 showing a top plan view of said means;

Figs. 9, 10 and 10$^a$ are vertical transverse sections on the planes of the lines 9—9, 10—10 and 10$^a$—10$^a$ of Fig. 8;

Fig. 11 is a longitudinal sectional view on the plane designated by the line 11—11 of Fig. 8;

Fig. 12 is a perspective view of the insulating block upon which the flash creating means just alluded to is supported;

Fig. 13 is a perspective view of this means in normal position;

Fig. 14 is a similar view thereof with the upper section of the base raised for the application of a fuse;

Fig. 15 is a front elevation of the unit employed in a fire-place or the like to represent fire light;

Fig. 16 is a top plan view thereof;

Fig. 17 is a horizontal section on the plane of the line 17—17 of Fig. 15;

Fig. 18 is a detail longitudinal section on the plane indicated by the line 18—18 of Fig. 16;

Fig. 19 is a front elevation of the camera shutter showing the electric release therefor;

Fig. 20 is a sectional view of the collapsible armature connected with the operating lever of the shutter to be attracted by the electro-magnet depicted in Fig. 19;

Fig. 21 is a diagram showing the wiring between the numerous individual elements of the several units of the apparatus and between said units.

In specifically describing the structure shown in the drawings above briefly described, similar characters will be employed to designate corresponding parts throughout the several views and reference will be herein made to the numerous elements by their respective indices. To this end, A designates the unit of the apparatus which is employed for taking ordinary flashlight pictures, B has reference to the unit whose flash represents fire light, C designates the means for releasing the camera shutter simultaneously with the operation of either or both of the units A, B according to the number in use, and D designates the foot control of the groups of parts designated by the letters A, B and C. For the sake of clearness, the individual units or groups A, B, C and D will be first described in detail and the wiring connecting the same will then be entered into.

The numeral 1 designates an arcuate sheet metal back plate preferably reinforced by beads along its edges, a disk 2 being hinged at its lower edge to the upper end of plate 1 while to the upper edge of said disk a main rib 3 of a frame somewhat similar to that of an umbrella is pivoted. Other ribs 4 are also pivoted to the disk 2, all of said ribs having braces 5 pivoted thereto while a similar brace 5ª rises from the lower portion of the member 1. The braces 5 and 5ª are connected with an operating member 6. A wire 7 is connected at one end to the member 6 and at its other end to a rod 8 which slides through a central aperture in disk 2 (see more particularly Figs. 1 and 6). The rod 8 carries a spring extended catch 9 for coöperation with the disk 2 to retain the braces 5 in such position as to hold the frame extended. When, however, this catch is released, said frame may collapse (see Fig. 2). When this happens, the rod 8 moves into the frame and for permitting it to be again withdrawn to extend said frame, a chain or the like 10 is connected thereto.

The ribs 4 extend to the four corners of a rectangular casing 11 which is formed of canvas or other suitable material, all of the parts so far specifically described being housed within said casing. The back of the latter is preferably provided with a lining 12 of white material which is so treated as to render it fire-proof, the front 13 of the casing being of similar material treated in the same manner, said front being necessarily more or less opaque to permit light from the constantly illuminated lamps and the flashing devices within said casing to radiate upon the object or objects being photographed.

To permit access into the casing 11 whenever necessary, the lower edge of the front 13 is detachably connected with the lower edge of the casing back, this being preferably done by inserting said edge of the front beneath a flap 14 secured to the back of the casing, suitable snap fasteners 15 being provided for securing said edge and flap together (see Figs. 3 and 4). In most cases, tabs 16 will be provided to permit easy disengagement of the fasteners 15.

By means yet to be described, a quantity of powder may be ignited within the casing 11, the means for igniting said powder being insertible into said casing through a door 17 in the rear side thereof, and for permitting the smoke to be readily expelled from the interior of the casing after the flash, a pair of handles 18 are disposed on the exterior of the device and secured to the plate 1 and rib 3. The provision of these handles permits the casing 11 to be contracted and expanded in somewhat the same manner as a bellows, whereupon the smoke and the like will be expelled through door 17 when the latter is opened, it being of course understood that the operator will grasp the two handles 18 one in each hand. The lowermost handle 18 has formed therethrough an arcuate series of openings 19 to receive the reduced upper end 20 of a suitable stand 21 whereby the casing 11 may be supported at any suitable angle for attaining the best results.

The plate 1 has formed therein an opening 22 which registers with the door 17 and extending inwardly from the upright edges of said opening are two vertically extending flanges 23. A metal shelf 24 is secured between the flanges 23 above the opening 22 and has its front end directed upwardly to provide a shield 25 disposed in advance of a lamp 26 whose socket 27 is supported on said shelf. An insulating block 28 extends forwardly from the plate 1 at the lower edge of the opening 22 and is rigidly supported between the flanges 23. The socket 29 of a lower lamp 30 is secured to the under side of the block 28, both of the lamps 26 and 30 preferably being surrounded by appropriate guards 31 which prevent injury thereof by the folding ribs of the supporting frame of the casing 11.

The block 28 has formed in its upper side a pair of longitudinally extending grooves 31 and 32, a pair of resilient contact fingers 33 and 34 being secured in groove 31, while a third contact finger 35 is mounted at the front end of the groove 32 (see Figs. 7, 11 and 12). The fingers 33, 34 and 35 coöperate with additional contacts in a manner to be described.

A wire 36 is electrically connected with the finger 33 and leads therefrom to a binding post 37 which is carried beneath and by the rear end of block 28. A wire 38 leads from post 37 to a suitably shielded resistance coil 39 mounted on the lower end of the plate 1 and a wire 40 extends from said coil to the contact finger 34. From the finger 35 a wire 41 leads to one terminal 42 of the socket 29 of the lower lamp 30. A negative lead wire 43 is electrically connected with the terminal 42 while a positive lead 44 extends to the other terminal 42' of the socket 29, the two leads 43 and 44 having at their free ends sockets 45 by means of which current conducting wires to be described are connected therewith. Branch wires 43' and 44' extend from the terminals 42 and 42' to the terminals of the lamp socket 27. The leads 43 and 44 thus serve to constantly illuminate the lamps 26 and 30 and the negative lead 43 serves as a return for additional circuits to be hereinafter traced, the positive lead of these circuits being in the form of a wire 46 connected to the binding post 37, and having on its outer end a socket 47. The sockets 45 and 47 will be formed in a single socket member for the sake of convenience.

A rectangular base member 48 is insertible into the casing 11 through the door 17 (see more particularly Fig. 7), this base being constructed of upper and lower sections 49 and 50 hinged together at 51 and 52 (see Figs. 13 and 14), both of said sections being in the form of plates of fiber or other insulating material. The plate 50 rests slidably on the insulating block 28 and said block together with the flanges 23 constitutes a guideway for the entire base and parts yet to be described which are mounted thereon. The edges of the block 28 are preferably equipped with angular flanges 53 which receive the edges of said plate 50 as indicated clearly in Figs. 9, 10 and 12.

The plate 50 carries on its under side a contact 33', a second contact 34' and a third contact 35', these contacts being adapted for engagement with the contact fingers 33, 34 and 35 respectively when the base 48 is inserted into the casing. A pair of metal terminal plates 54 are secured on the upper side of the base plate 50 at the front end thereof, said plates having their inner ends extended upwardly and spaced apart as indicated at 35, a small block 56 of insulating material being preferably though not necessarily interposed between said ends (see Figs. 10ª and 14). This construction permits a fuse 57 to be disposed across the terminals 54 whereby said fuse will be blown when the electric current is switched on and will thus serve to ignite a quantity of powder in a pan 58 mounted on the front end of plate 49, said plate and the bottom of the pan having openings 58' through which upturned ends 55 of the terminals 54 project, the fuse being thus held in place as shown clearly in Fig. 10ª.

A metallic wall 59 rises from the rear side of the pan 58 and carries at its upper edge an auxiliary powder pan 60 having a perforated bottom whereby the flame from the flashing powder in pan 58 may ignite that contained in 60 to produce a double flash. The wall 59 has formed therein an opening 61 whose edge is insulated at 62 and a resilient vibrating arm 63 extends through said opening with its front end directed downwardly and provided with a clamp 64 by means of which a contact finger 65 is adjustably secured thereto, the lower end of said finger being adapted for successive contact with the bottom of the pan 58 to make and break an electric current in a manner to be described, thus creating a spark which may in some cases be employed in lieu of the fuse 67. The rear end of the arm 63 is secured to the plate 49, this end of said arm being electrically connected by a wire or the like 66 with a switch arm 67 pivoted on said plate, this arm coöperating with a contact 68 connected by a wire 69 with the hinge 51, said hinge being in turn connected with the contact 34' by a wire 70. A wire 71 leads from the rear end of the arm 63 to an electro-magnet 72 mounted beneath said arm while leading from said magnet is a wire 73 connected by a binding post 74 with the wall 59 by which current will be transferred to the bottom of the pan 58. A wire 75 leads from the post 74 to the hinge 52 and an additional wire 76 extends from said hinge to the contact point 35'.

The operation of the unit A as so far described is as follows, (see Fig. 21:) Current comes from a supply through the positive lead 44 to lamps 30 and 26 and returns from the latter through the negative lead 43, thus constantly illuminating both of said lamps to permit the same to sufficiently light up the object to ascertain approximately what light effects will be produced thereon by the flash caused by the powder within the pans 58 and 60. If a fuse 57 is to be employed for igniting the powder, it will be secured in place as above described and the switch arm 67 will be disengaged from the contact 68. The current now passes through the second positive lead 46 to the binding post 37, from the latter through wire 36 to the contact finger 33. From this finger the current travels through the contact 33', plates 54 and fuse 57 and the contact 35' to the finger 35. The wire 41 then conducts the electricity to the return or negative lead 43. It will thus be evident that by employing the fuse 57 having the proper characteristics, this fuse will be blown by the passage of electricity therethrough and will thus ignite the charges of powder in the pans 58 and 60.

If the powder is to be ignited by a jump spark rather than by the blowing of a fuse, the switch 67 will be thrown into engagement with the contact 68. The leads 43 and 44 will now illuminate the lamps 26 and 30 as before and the current will enter the auxiliary lead 46 as above described. From the binding post 37, however, the current passes to the resistance coil 39 through the wire 38 and from this coil along the wire 40 to the contact finger 34. The latter being in engagement with the contact 34', the current will pass through the latter to the hinge 51 by means of the wire 70. Wire 69 conducts the current from the hinge 51 to the contact 68 from which it passes through the switch arm 67 and wire 66 to the arm 63. From this arm the current is conducted through the magnet 72 by means of the wire 71 and is led from said magnet to the pan 58 through the wire 70 and binding post 74. From the latter the electricity travels through wire 75, hinge 52 and wire 76 to contact 35' and contact finger 35, and from the latter it returns to the negative lead 43 by way of the wire 41. Completion of the circuit in this manner energizes magnet 72 and depresses arm 63 until the finger 65 contacts with the bottom of the pan 58. The moment this takes place, however, said arm and finger will short circuit the current and will thus throw the magnet 72 momentarily out of operation. The result is that the arm 63 will rise and move the finger 65 out of contact with the pan 58. The moment this occurs a spark will jump between said finger and pan. Simultaneously with this operation, the magnet 72 will return to use and will thus again depress arm 63. The finger 65 will therefore be vibrated vertically by the arm 63 and will thus cause a series of sparks within the pan 58 to ignite the powder placed in the latter as well as that which may be confined in pan 60.

In case the device is to be employed in localities at which electricity is not available for igniting charges of powder in the manner above described, it is my intention to provide other means for accomplishing the same results. To this end, a slide 80 is mounted between suitable guides 81 on the rear side of the wall 59, said slide and the lower end of this wall having registering openings 82 shown clearly in Fig. 11. A spring arm 83 is secured at its upper end to slide 80 and carries at its lower end a knife edge projection 84 presented opposite the openings 82 and adapted to hold an explosive cap in position over said openings in contact with the rear side of the slide. A bolt 85 is slidably mounted in a bracket 86 which rises from the upper plate or section 49 of the base 48. A finger 87 rises from the bolt 85 for reception in a lateral offset 88 of a slot 89 formed in the laterally bent upper end of the bracket 86, whereby said bolt may be held retracted against the tension of a coil spring 90 which serves to project said bolt when released. A pneumatic 91 is mounted on the bracket 86 in contact with the finger 87 (see Figs. 8, 10 and 11), said pneumatic being adapted to be expanded when air is forced thereinto through a tube 92, this being done by the depression of a bulb in the well known manner, and as will be hereinafter described, this operation may be made to take place simultaneously with the releasing of the camera shutter by the same pneumatic means.

From the foregoing description of the illuminating unit A when considered in connection with Figs. 1 to 14 and 20 of the drawings, it will be observed that although excellent results can be obtained by the use of said unit, the latter is compact and comparatively simple, particular emphasis being laid upon the fact that the entire base 48 and all parts carried thereby may be removed at will through the door 17 for cleaning and recharging. When this is done, the contacts 33, 34 and 35 will disengage their respective contact fingers 33', 34' and 35' but when the base is again applied, these parts will assume their original relations and will thus be in condition to further perform their individual functions. It may also be here explained that the resilient finger 65 constructed as shown with a coil at its upper end, is a rather important feature since said finger is permitted to vibrate freely and thus has a tendency to scrape or jar loose any products of combustion which may have adhered to the bottom of the pan 58.

The unit B, as above suggested, is adapted to be placed in a fire-place or the like to illuminate the object or objects to be photographed with a light similar in most respects to that cast by a fire-place. This result is attained by constructing the unit in question in the novel manner now to be described.

A casing 95 of galvanized metal or the like is provided, said casing being elongated horizontally and having an open front side whose edge will preferably be reinforced by beading the same. The top of the casing 95 has formed therethrough an opening 96 and secured to said top and located within the casing is a block 97 of suitable insulating material. Two metallic plates 98 and 99 are secured in any preferred manner to the upper side of the block 97 within the opening 96, and a pair of bolts 100 are passed downwardly through said plates and through said block 97, said bolts being normally depressed by means of springs 101 whereby a fuse 102 may be held beneath the heads thereof to bridge the gap between the plates 98 and 99.

A metal plate 103 is disposed in a cavity 104 in the top of the block 97, said plate having a binding post 105 which depends through said block as shown clearly in Fig.

18. A negative lead wire 106 passes through an opening in the rear of the casing and through an insulating plate 107 secured thereto and is attached to said binding post 105, the main positive lead 108 also passing through said opening and being secured to a second binding post 109 depending from the block 97. From the two posts 105 and 109 current conducting wires 110 and 111 respectively lead to the opposite terminals of a pair of lamps 112 which are disposed in the ends of the casing 95. A wire or the like 114 leads from plate 98 to a contact 115 coöperating with a pivoted switch arm 116 fulcrumed to the block 97 on the under side thereof. The inner end of the arm 116 preferably contacts with a metal plate 117 having a binding post 118 from which an auxiliary positive lead 119 extends through the opening in the casing with the wires 106 and 108.

The switch arm 116 also coöperates with a contact 120 connected by a wire 121 with a choke or resistance coil 122, while leading from this coil to one end of a solenoid coil 123 is a wire 124, the other end of said coil being connected by a wire 125 with the binding post 105. The solenoid 123 is mounted beneath and supported by the block 97 and the core 126 of the solenoid rises without contact through alined openings in said block 97 and in the plate 103, the upper end of said coil having thereon a cross head 127 equipped with a pair of fingers held normally in contact with plate 123 by the tension of a coil spring 128 acting on the lower end of the core. A branch wire 129 leads from wire 124 and is electrically connected through the spring 128 or otherwise to the core 126.

In operation, the current will pass through the main lead wire 108 to the binding post 109, from which post it will be supplied to the two lamps 112 through the wires 111. From said lamps the current will return to the binding post 105 through the wires 110 and from said post will pass to the battery through the negative lead 106. This constantly illuminates the lamps 112.

When a fuse 102 is placed across the gap between the two plates 98 and 99, the switch arm 116 will be swung into engagement with contact 115 (see Fig. 21). The current will then pass through the auxiliary lead 119, post 118, connector 117, arm 116, contact 115 and wire 114 to plate 98. From this plate it will travel through the fuse 102 to plate 99, from the latter to binding post 105 and will return from the latter through the negative lead 106. The completion of this circuit will blow the fuse 122 to ignite a charge of powder which will be held in a suitable pan 130, said pan resting on the casing 95 (see Fig. 15). This obviously causes a flash, but previously to the firing thereof, the object will be properly located in order that the best light effects may prevail thereon, this being ascertained by the use of the constantly illuminated lamps 112.

When it is required to ignite the charge of powder by an electric spark rather than by blowing of a fuse, the switch arm 116 is swung into engagement with the contact 120. The current now passes through the auxiliary lead 119, post 118, connector 117, arm 116, contact 120 and wire 121 to the choke or resistance coil 122. From coil 122 the current passes through wire 124 to the solenoid coil 123 and from the latter through wire 125 to binding post 105. From this post the current returns through the negative lead 106. A shunt circuit is created through the wire 129, core 126, cross head 127 and plate 103, and when the solenoid coil 123 is energized it will raise said core and will thus break said shunt circuit with the result that an electric spark will jump between the ends of the cross head 127 and plate 123. This spark will ignite the charge of powder.

Through the medium of a system of wiring to be hereinafter described, the unit C having connection with the shutter 135 of any suitable type of camera, and the units A and B are all operated simultaneously when the foot control D is actuated to complete the several circuits. The unit C in brief consists of an electro-magnet 136 and a telescopic armature 137 which is mounted on an arm 138 secured to one of the manual releases 139 of the shutter 135. The armature 137 comprises a plurality of telescoping tubes 140 having stop flanges 141 on their upper ends which overlie each other as shown in Fig. 20 to normally hold the several tubes in a predetermined relation, the upper and larger tube being secured in an opening at the free end of the arm 138. Said last named tube is the largest of the series and the others decrease gradually in size and increase in length, the lower ends of all of said tubes having thereon horizontally disposed disks 142 which are spaced equally as shown in Figs. 19 and 20. The magnet 136 is disposed immediately beneath the lowermost disk 142 and the result is that when said magnet is energized the disks will be successively drawn toward said magnet until finally the uppermost of said disks is moved downwardly to its limit. When the parts stand in this manner, the arm 138 will have been depressed sufficiently to trip the shutter 135 to make an exposure on the film or plate in the camera.

The control unit D (see Fig. 1) comprises a base 145 to rest on the floor, a spring raised foot pedal 146 pivoted to said base, and coacting contacts 147 and 148 carried respectively by said base and pedal. See also Fig. 21.

A wire 149 leads from the contact 147 and is provided at its end with a suitable plug for reception in a socket 150 on a branch wire 151 electrically connected with an additional wire 152, this wire being connected between its ends to the main positive lead 153 which will lead to one pole of any suitable source of current supply. The main negative lead 154 is electrically connected between the ends of a wire 155. The wires 152 and 155 are electrically connected at one end with the wires 44 and 43 of the unit A, being equipped with suitable plugs for reception in the sockets 45, while the other ends of said wires 152 and 155 are equipped with similar plugs for reception in sockets 156 on the free ends of the wires 108 and 106 of the unit B. It will thus be obvious that by these connections the circuits of the lamps 26, 30 and 112 will be constantly completed. The other circuits are controlled by depression of the pedal 146.

For illustrative purposes, a wire 157 is shown leading from the contact 148 to the magnet 136 and an additional wire 158 is illustrated as leading from said magnet, said last named wire having a plug at its free end for reception in a socket 157 on one end of a wire 160 which branches form an auxiliary positive lead 161. One end of the lead 161 has thereon a plug for reception in the socket 47 of the unit A while the other end of said lead is equipped with a similar plug for engagement with a socket 162 on the free end of the wire 119 of the unit B.

By the wiring above described, when the foot pedal 146 is depressed, the current will shunt from wire 152 through 151, 150, 149, 147, 148 and 157 to the magnet 136 of the unit C. From this magnet, the current will travel through 158, 149 and 160 to the wire 161 from which it will be directed to the two units A and B to perform the work above set forth, returning to the source through the negative leads 43, 106, 155 and 154. It will be obvious that the circuits traveling in this manner will simultaneously actuate the shutter 135 and the two flash forming units A and B thereby producing the desired results.

Either one of the units A, B might well be employed with units C and D and similarly, the units may in some cases be used without unit C. They are all closely related, however, and serve in the manner shown in Fig. 21 to produce a unitary result, namely, the proper amount and distribution of light for taking photographs under light conditions representing rays from a fire-place or the like.

For the purpose of operating the pneumatic 91, a bulb 165 will be carried by the pedal 146 to be collapsed by depression of said pedal and the tube 92 will be connected with said bulb as indicated in Fig. 1. A branch 92' may lead from tube 92 to the pneumatic control 166 of the shutter 135 (see Fig. 19).

From the foregoing, taken in connection with the accompanying drawings, the construction, manner of operation and advantages of the apparatus will be readily understood without requiring a more extended explanation but in conclusion, I will state that although certain specific details of construction have been shown and described for the attainment of the best results, numerous changes may be made within the scope of the invention as claimed without sacrificing the main advantages thereof.

I claim:

1. In an apparatus for photographing by artificial light, the combination of a base member composed of upper and lower sections hinged together, a powder pan mounted on the upper section and having in its bottom an opening, a pair of spaced terminals on the lower section for reception in said opening when the upper section is lowered, said terminals being adapted to be connected by a fuse, and means for supplying electric current to said terminals for blowing said fuse to ignite the contents of the pan.

2. In an apparatus for photographing by artificial light, the combination of a base, a powder pan mounted thereon and having a vertically projecting wall rising from its rear side, said wall having therethrough an opening, an angular vibrating arm mounted on said base and extending through said opening, a finger depending from the front end of said arm for contact with the pan, and means for vibrating said finger to make and break contact between said finger and pan, electric current being supplied to said finger and pan whereby to create electric sparks as the finger is raised and lowered.

3. In an apparatus for permitting photography by artificial light, a folding frame consisting of a vertically elongated back plate, a disk hinged at its lower edge to the upper end thereof and adapted to fold forwardly, a plurality of ribs pivoted to and radiating from said disk, braces pivoted to said ribs and extending inwardly to a central point spaced in advance of the disk, an additional brace pivoted to the back plate and also extending to said point, an operating member at this point to which all of said braces are pivoted, an anchoring device connected to said operating member and slidable through an opening in the aforesaid disk for holding said operating member in operative position or for releasing the same, a flash creating device mounted on the back plate, and a flexible casing mounted on the aforesaid ribs and having an opaque front.

4. In an apparatus for permitting photography by artificial light, a folding frame consisting of a vertically elongated back plate, a disk hinged at its lower edge to the upper end thereof and adapted to fold forwardly, a plurality of ribs pivoted to and radiating from said disk, braces pivoted to said ribs and extending inwardly to a central point spaced in advance of the back plate, an additional brace pivoted to the back plate and also extending to said point, an operating member at this point to which all of said ribs are pivoted, an anchoring device connected to said operating member and slidable through an opening in the aforesaid disk for holding said operating member in operative position or for releasing the same, upper and lower members extending forwardly from the back plate, upper and lower electric lamps mounted on said members, a flash creating device mounted between said members, and a flexible casing supported by the aforesaid ribs and having an opaque front.

5. A mechanism for electrically depressing the manual control of a camera shutter, said mechanism comprising an arm to be secured to said control, a plurality of vertically spaced metal plates suspended from said arm, and an electro-magnet below said plates for successively attracting the same, said plates having loose connections with the arm to permit continued downward movement of the latter after any plate has reached the limit of its downward movement.

6. A mechanism for electrically depressing the manual control of a camera shutter, said mechanism comprising an arm to be secured to said control, a plurality of telescopic tubes having shoulders at their upper ends overlying each other, the outermost of said tubes being sustained by the aforesaid arm and being comparatively short, the other tubes increasing gradually in length, outstanding disks carried by the lower ends of said tubes, and an electro-magnet below said disks for successively attracting the same.

7. An apparatus for photographing fireside scenes comprising one unit consisting of a casing having an opaque portion and a flash creating device in said casing for illuminating the subject with a soft light, and a second unit consisting of an unshielded flash creating device to be placed in a fireplace or the like to create a flash representing fire-light; in combination with means for simultaneously operating both of said flash creating devices.

8. An apparatus for photographing fireside scenes comprising one unit consisting of a casing having an opaque portion, a flash creating device in said casing for illuminating the subject with a soft light, and an electric light in said casing for illuminating the subject before the flash is created, and a second unit consisting of a rigid casing having one open side, an unshielded flash creating device carried by the top of said casing, and an electric lamp in said casing, said casing being adapted for disposition in a fire-place or the like to permit its flash creating device to represent fire-light and said last named electric light being adapted to illuminate the subject before the flash; in combination with means for simultaneously operating both of said flash creating devices.

9. An apparatus for representing fire-light for photographic purposes comprising a horizontally elongated rigid casing to be disposed in a fire-place or the like, said casing being open at one side, a powder receptacle on the top of said casing, electric means confined in said casing for igniting the powder in said receptacle, and an electric light in said casing for projecting its rays from the open side thereof to illuminate the subject before the flash.

10. An apparatus for representing fire-light for photographic purposes comprising a horizontally elongated rigid casing to be disposed in a fire-place or the like, said casing being open at one side and having in its top an opening, an insulating and fireproof block secured to the lower surface of said top and extending over said opening to support a quantity of powder, electric means mounted on said block for igniting said powder, and an electric lamp in said casing for projecting rays through the open side thereof to illuminate the subject before the flash.

In testimony whereof I have hereunto set my hand in the presence of two subscribing witnesses.

DAVID CHARLES McCANDLESS.

Witnesses:
W. A. LINDSEY,
W. M. PERRY.